United States Patent
McCune et al.

(10) Patent No.: US 9,892,126 B2
(45) Date of Patent: Feb. 13, 2018

(54) OPTIMIZED CACHING BASED ON HISTORICAL PRODUCTION PATTERNS FOR CATALOGS

(71) Applicant: International Business Machines Corporation, Armonk, NY (US)

(72) Inventors: Franklin E. McCune, Tucson, AZ (US); David C. Reed, Tucson, AZ (US); Keith R. Smith, Orlando, FL (US); Max D. Smith, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 585 days.

(21) Appl. No.: 13/743,749

(22) Filed: Jan. 17, 2013

(65) Prior Publication Data

US 2014/0201459 A1    Jul. 17, 2014

(51) Int. Cl.
| G06F 12/00 | (2006.01) |
| G06F 17/30 | (2006.01) |
| G06F 12/02 | (2006.01) |
| G06F 3/06 | (2006.01) |

(52) U.S. Cl.
CPC .......... *G06F 17/301* (2013.01); *G06F 12/023* (2013.01); *G06F 3/061* (2013.01); *G06F 3/0631* (2013.01); *G06F 3/0644* (2013.01); *G06F 2212/1016* (2013.01); *G06F 2212/263* (2013.01)

(58) Field of Classification Search
CPC .................................................. G06F 12/0888
USPC ........................................................ 711/138
See application file for complete search history.

(56) References Cited

U.S. PATENT DOCUMENTS

| 5,131,087 | A | * | 7/1992 | Warr ............................. 711/113 |
| 5,134,696 | A | * | 7/1992 | Brown et al. ..................... 711/3 |
| 5,499,354 | A | * | 3/1996 | Aschoff et al. ............... 711/129 |
| 5,987,561 | A | * | 11/1999 | Witt et al. ......................... 711/3 |
| 6,286,080 | B1 | | 9/2001 | Galbraith et al. |
| 6,978,349 | B1 | | 12/2005 | Wilkes |
| 7,228,388 | B2 | | 6/2007 | Hu et al. |
| 7,426,696 | B1 | * | 9/2008 | Hwang et al. ................ 715/784 |
| 7,856,530 | B1 | * | 12/2010 | Mu ............................... 711/119 |
| 7,890,537 | B2 | | 2/2011 | Kasten et al. |
| 7,895,160 | B2 | | 2/2011 | Ewing et al. |
| 8,024,519 | B2 | | 9/2011 | Lehr et al. |
| 8,234,242 | B2 | | 7/2012 | Lehr et al. |
| 2004/0117441 | A1 | * | 6/2004 | Liu et al. ....................... 709/203 |
| 2006/0112219 | A1 | | 5/2006 | Chawla et al. |
| 2009/0037662 | A1 | | 2/2009 | La Frese et al. |
| 2009/0037664 | A1 | * | 2/2009 | Kornegay et al. ............ 711/138 |

(Continued)

OTHER PUBLICATIONS

IBM Corp., System management facilities manual, 14.78 Record Type 74 (4A)—RMF Activity of Several Resources, http://publibz.boulder.ibm.com/cgi-bin/bookmgr_OS390/BOOKS/iea2g2c3/14.78?SHELF=all13be9&DT=20120918134429, printed Dec. 13, 2012.

*Primary Examiner* — Mark Giardino, Jr.
*Assistant Examiner* — Tasnima Matin
(74) *Attorney, Agent, or Firm* — Terrile, Cannatti, Chambers & Holland, LLP; Stephen A. Terrile

(57) ABSTRACT

A method, system and computer readable medium that predict times where cost of catalog caching is not efficient and deactivating catalog caching for that catalog during the predicted times. More specifically, an optimized catalog caching operation conducts historical analysis on catalog usage via records such as resource measurement facility (RMF) records and catalog statistical data.

12 Claims, 3 Drawing Sheets

(56) References Cited

U.S. PATENT DOCUMENTS

2010/0122026 A1    5/2010  Umamageswaran et al.
2011/0173350 A1*  7/2011  Coronado et al. ................ 710/8
2011/0307659 A1*  12/2011  Hans et al. ................... 711/114
2012/0005657 A1    1/2012  Huber et al.
2012/0096053 A1    4/2012  Lehr et al.

* cited by examiner

OPTIMIZED CACHING BASED ON HISTORICAL PRODUCTION PATTERNS FOR CATALOGS

BACKGROUND OF THE INVENTION

Field of the Invention

The present invention relates in general to the field of computer operations and, more particularly to common memory orphan storage release.

Description of the Related Art

It is known to control storage systems using powerful host computer systems such as mainframe type computer systems. These host systems execute operating systems such as the z/OS operating system available from IBM. The z/OS operating system is well suited for continuation, high volume operation with high security and stability.

On issue that can occur when operating within an operating system such as the z/OS operating system environment, relates to a Catalog Services function. The Catalog Services function is responsible for recording the location of data sets (i.e., files) and their attributes for reference by any application and stores this information in control data sets which are referred to as basic catalog structure (BCS) type catalogs. Especially during peak periods of production, there can be heavy amounts of input/output (IO) performed against these BCS catalog data sets potentially causing contention as the catalog services function attempts to keep these catalogs synchronized.

One form of relief for this issue is by using the local cache on each system to allow the catalog service function to retrieve frequently viewed records from memory as opposed to performing IO operations (e.g., to Direct Access Storage Device (DASD)) which can potentially be processor intensive and time consuming. As with any service however, there is a point in which the overhead associated with managing the cache exceeds that of just accessing the data directly from DASD. This point can occur when catalog records are constantly placed into cache and immediately invalidated due to updates from a second system. In these cases after invalidating the cache, the Catalog Services function often must access DASD directly to update the cache for the new record. In known systems, the cache is either active or inactive for a catalog.

SUMMARY OF THE INVENTION

In accordance with the present invention, a method, system and computer readable medium are provided that predicts times where cost of catalog caching is not efficient (i.e., does not provide a better response time compared to performing IO operations) and deactivating catalog caching for that catalog during the predicted times.

More specifically, in certain embodiments, an optimized catalog caching module conducts historical analysis on catalog usage via records such as resource measurement facility (RMF) records (which, e.g., provide statistical information such as Io rates to a volume) and catalog statistical data. The Optimized Catalog Caching module also performs analysis of IO rates for Catalog volumes. Using this information, the Optimized Catalog Caching module automatically removes or places catalogs into cache throughout the day based on which mode of operation provides the most likely best response time, either a cache mode of operation or a DASD mode of operation. Such an operation provides a benefit during times of heavy batch operations where updates to the catalog from multiple systems can degrade cache performance yet at other times of the day a cache mode of operation is preferred.

More specifically, in certain embodiments, the invention relates to a method for optimizing catalog system operations comprising: predicting times where a cost of catalog caching is not efficient; and, deactivating catalog caching for a catalog during times where the cost of catalog caching is not efficient.

In other embodiments, the invention relates to a system comprising: a processor; a data bus coupled to the processor; and a computer-usable medium embodying computer program code. The computer-usable medium being coupled to the data bus. The computer program code comprising instructions executable by the processor and configured for: predicting times where a cost of catalog caching is not efficient; and, deactivating catalog caching for a catalog during times where the cost of catalog caching is not efficient.

In other embodiments, the invention relates to a computer-usable medium embodying computer program code. The computer program code comprises computer executable instructions configured for: predicting times where a cost of catalog caching is not efficient; and, deactivating catalog caching for a catalog during times where the cost of catalog caching is not efficient.

BRIEF DESCRIPTION OF THE DRAWINGS

The present invention may be better understood, and its numerous objects, features and advantages made apparent to those skilled in the art by referencing the accompanying drawings. The use of the same reference number throughout the several figures designates a like or similar element.

DETAILED DESCRIPTION

Figure 1:
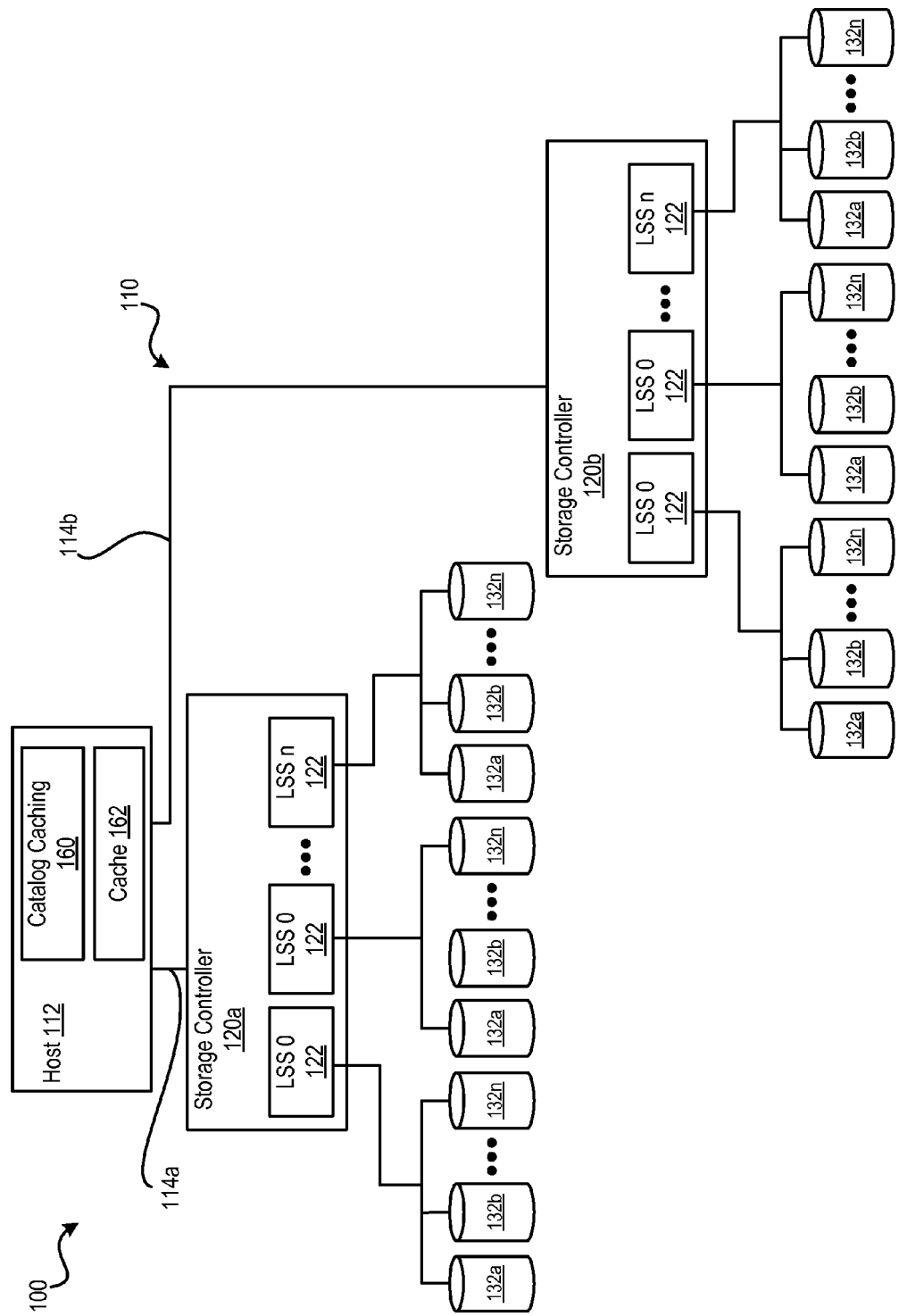
FIG. 1 is a block diagram showing a host computer in communication with a data storage system.

Many of the functional units described in this specification have been labeled as modules, to more particularly emphasize their implementation independence. For example, a module may be implemented as a hardware circuit comprising custom very large scale integration (VLSI) circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more physical or logical blocks of computer instructions which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of executable code may be a single instruction, or many instructions, and may even be distributed over several different code segments, among different programs, among different processors, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network.

Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

Reference to a computer readable medium may take any form capable of causing execution of a program of machine-readable instructions on a digital processing apparatus. A computer readable medium may be embodied by a compact disk, digital-video disk, a magnetic tape, a Bernoulli drive, a magnetic disk, holographic disk or tape, a punch card, flash memory, magnetoresistive memory, integrated circuits, or other digital processing apparatus memory device.

Furthermore, the described features, structures, or characteristics of the invention may be combined in any suitable manner in one or more embodiments. One skilled in the relevant art will recognize, however, that the invention may be practiced without one or more of the specific details, or with other methods, components, materials, and so forth. In other instances, well-known structures, materials, or operations are not shown or described in detail to avoid obscuring aspects of the invention.

Referring now to FIG. 1, a data processing system 100 comprises data storage system 110 and one or more host computers 112 (also referred to as hosts). The storage system 110 is in communication with host computer 112 via communication paths 114a, 114b. Communication paths 114a, 114b each comprise a communication link, where that communication link can be configured to comprise a plurality of logical pathways (e.g., up to 256 logical pathways). The illustrated embodiment shows a single host computer. In other embodiments, data storage system 110 may be in communication with a plurality of host computers.

Although the system is described in terms of a storage control unit or "controller" and logical storage subsystems (LSS), the system may be implemented with other devices as well. The storage system 110 includes a storage system such as those available from International Business Machines under the trade designation IBM DS6000 or DS8000. In certain embodiments, the storage system 110 includes two storage controllers 120a and 120b, storage devices 122, such as hard disk drivers (HDDs). In certain embodiments, the storage system can further include an interface, such as an IBM Enterprise Storage Server Network Interface (ESSNI) or other interface.

The host 112 is coupled to the storage controller via appropriate connections through which commands, queries, response and other information are exchanged. The storage controller 120 may be configured with one or more logical storage subsystems (LSSs) 132 (e.g., LSS 0, LSS 1, . . . LSS n). Each LSS is assigned one or more storage devices 132.

The host computer 112 includes provision for execution an Optimized Catalog Caching module 160 which performs historical analysis on catalog usage via records such as RMF records and catalog statistical data. The Optimized Catalog Caching module 160 also performs analysis of IO rates for Catalog volumes. Using this information, the Optimized Catalog Caching module 160 automatically removes or places catalogs into cache 162 throughout a period of time (e.g., a day) based on which mode of operation provides the most likely best response time, either a cache mode of operation or a DASD mode of operation.

Figure 2:
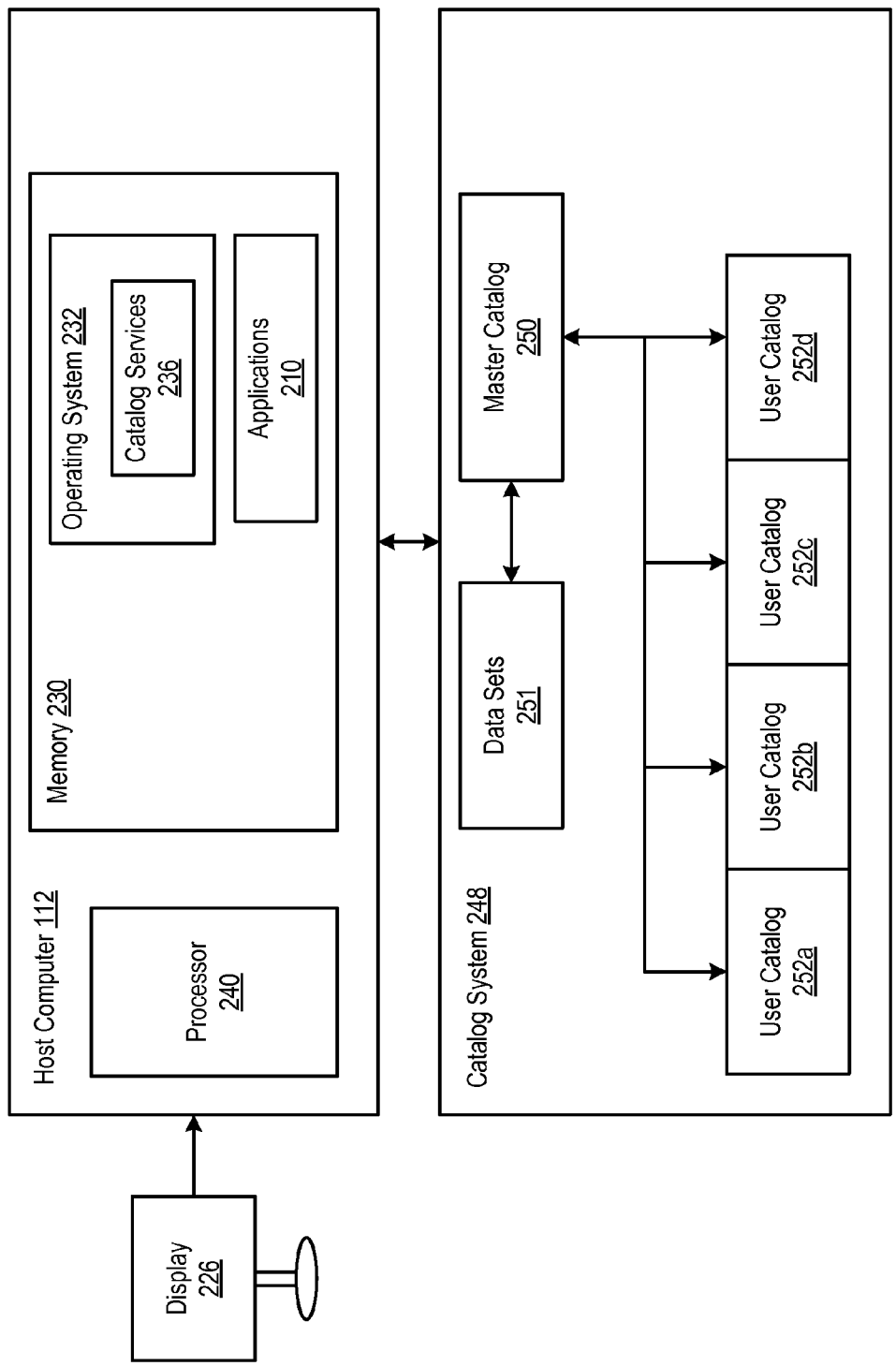
FIG. 2 is a block diagram showing a host computer communication path manager.

Referring to FIG. 2, the host computer 112 comprises a computer system, such as a mainframe, personal computer, workstation, and combinations thereof, including an operating system 205 such as z/OS, Windows, AIX, Unix, MVS, LINUX, etc. (Windows is a registered trademark of Microsoft Corporation; z/OS and AIX are registered trademarks and MVS is a trademark of IBM Corporation; and UNIX is a registered trademark in the United States and other countries licensed exclusively through The Open Group.) The host computer 112 can further include a storage management program 210. The storage management program in the host computer 112 may include the functionality of storage management type programs known in the art that manage the transfer of data to a data storage and retrieval system, such as the IBM DFSMS implemented in the IBM MVS operating system.

The host computer 112 comprises a memory 230 (e.g., a computer readable medium). An operating system 232 and applications 234 are stored on the memory 230. The operating system 232 includes a catalog services module 236 for providing a Catalog Services function. The operating system 232 and the applications 234 include instructions which may be loaded on and executed by a processor 240. The host computer 112 may be interconnected with display device 226. The display device 226 may be integral with host computer 112 or may be remote from host computer 112. For example, the display device 226 may be located in a system administrator's office.

The host computer 112 can also communicate with a catalog system 248. The catalog system includes a master catalog 250 as well as one or more data sets 251. The master catalog may communicate with a plurality of user catalogs 252 (e.g., user catalogs 252a, 252b, 252c, 252d). The master catalog 250 and the user catalogs 252 may be physically interconnected via host adapters within the storage controller 120.

Figure 3:
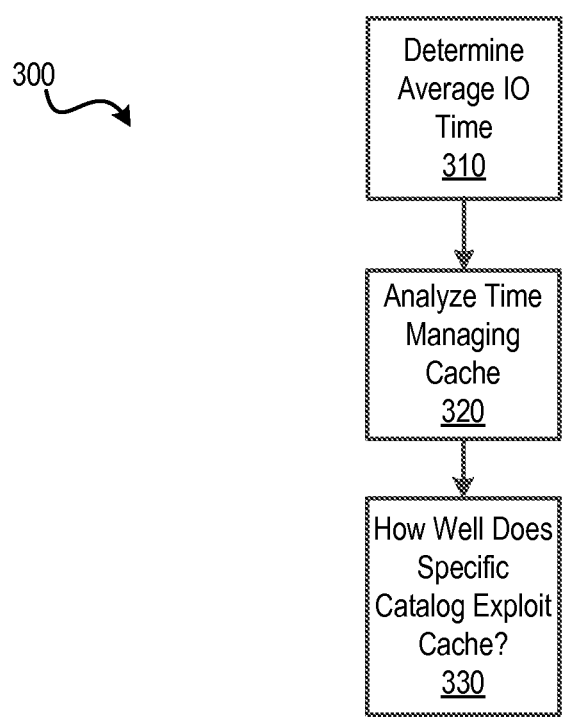
FIG. 3 is a flow chart of the operation of an optimized catalog caching operation.

Referring to FIG. 3, a flow chart of the operation of an optimized catalog caching operation is shown. More specifically, the optimized catalog caching operation determines whether a catalog should or should not be in a cache mode of operation such as a virtual look aside facility (VLF) cache mode of operation for a given interval. The optimized catalog caching operation uses three items of information when making this determination. More specifically, the optimized catalog cache operation determines an average IO time for a catalog's volume at step 310, how much time is invested in managing cache at step 320, and how well a specific catalog exploits the cache at step 330. For example a VLF cache exploits the VLF component and is generally ideal for catalogs shared by multiple systems. Alternately, an in-storage catalog (ISC) caching operation is managed by the catalog system itself and is best for catalogs specifically used by the system 100. During the optimized catalog caching operation, catalogs that are not shared with other systems are defaulted to using the ISC caching operation.

When determining an average IO time for a catalog's volume, IO statistics are collected to determine IO rates to specific catalog volumes at predetermined intervals (e.g., at 15 minute intervals). In certain embodiments, the IO statistics may be obtained by examining IO records such as RMF 74 type records where the RMF 74 records provide a list of IO statistics. When determining how much time is invested in managing the cache, the optimized catalog caching operation analyzes catalog cache statistics from a cache statistics report which is obtained via a catalog performance statistical information command such as the F CATALOG, PERFORMANCE, REPORT command. The cache statistics report that is generated by this command is used to provide times for specific caching functions. In certain embodiments, the command is generated at intervals comparable to the RMF operation throughout the day. After the catalog cache statistics are obtained, a reset catalog performance statistical information command such as the F CATALOG, REPORT, PERFORMANCE(RESET) command is used to reset the statistics thus allowing the optimized catalog caching operation to obtain proper interval samples. The cache statistics report provides overall caching statistics since these values are general to any catalog on the system. However, the optimized caching operation need only rely on RMF 74 records to determine IO rate to specific catalog volumes since these can vary. Table 1 shows an example of the cache statistics report.

TABLE 1

IEC359I CATALOG PERFORMANCE REPORT 399
*CAS*************************************************
* Statistics since 8:00:07.11 on 02/09/2012 *
* -----CATALOG EVENT---- --COUNT-- ----AVERAGE---- *
* BCS Get            135,687K    0.037 MSEC    *
* VLF Delete Major        348    0.120 MSEC    *
* VLF Create Minor    329,250    0.161 MSEC    *
* VLF Retrieve Minor    3,994K    0.010 MSEC    *
* VLF Delete Minor    329,694    0.098 MSEC    *
* VLF Identify            346    0.060 MSEC    *
*CAS*************************************************

More specifically, when performing the optimized caching operation, the catalog system first determines whether any entries in a catalog need to be purged prior to acquiring a record (for entry into the catalog) via either a cache operation or a DASD operation. The catalog system further performs a plurality of operations to verify the record. More specifically, the optimized caching operation invalidates entries cached where the record was updated from another system (e.g., by performing a VLF Delete Minor operation). The catalog system also queries the local cache for a copy of the record requested (e.g., by performing a VLF Retrieve Minor operation). Additionally, if the entry is not located, the catalog system performs an JO operation to DASD (e.g., via a BCS Get operation). Finally, the catalog system places the record into cache if the record was not previously found in the cache (e.g., by performing a caching services operation such as a VLF Create Minor operation).

The example cache statistics report might be from operation of a catalog system when accessing documentation during a heavy batch period. More specifically, the example scenario associates a multiple system shared catalog set up during a time of high batch activity where the record is not already stored within the cache. In this scenario, caching may add an extra 0.269 msec (0.098 Delete Minor+0.010 Retrieve Minor+0.161 Create Minor) while still needing to perform an IO to DASD via a DASD operation (thus adding an extra 0.037 msec to the operation). Even for a case where the record is already found in cache and an JO operation can be avoided, the catalog system would likely spend 0.108 msec (0.098 Delete Minor+0.010 Retrieve Minor) retrieving the record in a cache operation versus 0.037 msec if the catalog system accessed the record via a DASD operation. This result is somewhat counterintuitive as during normal batch hours, it is thought that the time invested in retrieving a record from a cache operation would to be less than that of an IO operation.

However, this scenario could be worse if the updates from other systems are so heavy that a purge of cache is required (e.g., by performing a Delete Major operation) followed by a redefining of the record to cache (e.g., by performing a DEFINE Major operation). In both cases where the entry is not found in the cache, a BCS Get operation is performed, so 0.269 MSECs could have been saved just by directly performing a DASD operation as opposed to first performing a cache operation. The cache operation can usually save processing time when the record is contained within the cache and an JO operation can be avoided. However, in the case of heavy activity to the catalog, this may not be the case most of the time.

When determining how a specific catalog exploits the cache, the catalog system accesses a per catalog caching report (e.g., via a F CATALOG, REPORT, CACHE operation). The per catalog caching report is sampled at specific intervals to match the cache statistics report and RMF. The per catalog caching report provides information that the optimized caching operation may use to determine how well each catalog exploits the cache. Table 2 provides an example of a per cache catalog performance report.

TABLE 2

*CAS***********************************************
***********
* HIT % -RECORDS- -SEARCHES --FOUND-- -DELETES- -SHR UPD---PURGE--
*
*
*
* SYS1.PROD.VICFCAT (VLF)
* 78%    28,668    139,707    109,351    2,579    313    121 *
* CAT.USER.VICFCAT (VLF)
*
* 74%    21,227    86,988    65,164    1,607    15    133 *

In certain embodiments, there is no method to reset the statistics of the per catalog caching report between intervals (short of closing the catalog). Accordingly, the optimized caching operation calculates deltas for each catalog cache statistic per interval. Thus the optimized caching operation determines the time spent accessing records from cache plus cache overhead (i.e., the time spent performing a cache operation) versus the time spent accessing records directly from DASD (i.e., the time spent performing a DASD operation). Cache overhead includes time spent on queries to cache that did not return records (i.e., frivolous cache requests) as well as time spent managing the cache. Time spend managing the cache includes time spend adding new records to the cache, time spent removing records from the cache and time spent purging all records within the cache when moving to a new catalog. More specifically:

Time spent accessing records from cache=Searches*VLF_Retrieve_Minor_time
Time spent on frivolous cache requests= [(Searches-Found)*Catalog_IC_time]Time spent managing cache= (Deletes*VLF_Delete_Minor_time)+ (Purge*VLF_Delete_Major_time)+[(Records+ Deletes)*VLF_Create_Minor_time]−vs−Time we would have spent going straight to DASD=Searches*Catalog_IC_time Based on where the catalog system spends the least time accessing catalog records, the optimized catalog caching operation selects the best option for that time interval for that specific catalog. The optimized catalog caching operation then selects this best option by issuing a cease caching command (e.g., via a F CATALOG, NOVLF (catalog name)) to take a catalog system out of a cache mode of operation (such as a VLF mode of operation) for a specific amount of time and issuing a resume caching command (e.g., via a F CATALOG,VLF (catalog name)) to place the catalog system back into a cache mode of operation.

Although the present invention has been described in detail, it should be understood that various changes, substitutions and alterations can be made hereto without departing from the spirit and scope of the invention as defined by the appended claims.

What is claimed is:

1. A method for optimizing catalog system operations comprising:
   executing an optimized catalog caching module on a host system;
   communicating with a catalog system via the host system, the catalog system comprising a master catalog, a data set and a plurality of user catalogs, the plurality of user catalogs comprising basic catalog structure (BCS) type catalogs;
   performing historical analysis on catalog usage via the optimized catalog caching module;
   performing analysis of input/output rates for catalog volumes via the optimized catalog caching module;
   predicting times where a cost of catalog caching is not efficient, the predicting times comprising conducting historical analysis on catalog usage via catalog statistical data, the times where a cost of catalog caching is not efficient comprising times of batch operations where updates to a catalog from multiple systems degrade cache performance; and,
   automatically controlling catalog caching throughout a period of time based upon a mode of operation providing a best response time, the mode of operation comprising a cache mode of operation and a direct access storage device (DASD) mode of operation.

2. The method of claim 1, wherein:
   the catalog statistical data comprises resource measurement facility (RMF) records.

3. The method of claim 1, further comprising:
   reactivating catalog caching during times where a caching mode of operation provides a most likely best response time.

4. The method of claim 1, wherein:
   the catalog caching comprises a virtual look aside facility (VLF) caching.

5. A system comprising:
   a processor;
   a data bus coupled to the processor; and
   a non-transitory computer-usable medium embodying computer program code, the computer-usable medium being coupled to the data bus, the computer program code comprising instructions executable by the processor and configured for:
   executing an optimized catalog caching module on a host system;
   communicating with a catalog system via the host system, the catalog system comprising a master catalog, a data set and a plurality of user catalogs, the plurality of user catalogs comprising basic catalog structure (BCS) type catalogs;
   performing historical analysis on catalog usage via the optimized catalog caching module;
   performing analysis of input/output rates for catalog volumes via the optimized catalog caching module;
   predicting times where a cost of catalog caching is not efficient, the predicting times comprising conducting historical analysis on catalog usage via catalog statistical data, the times where a cost of catalog caching is not efficient comprising times of batch operations where updates to a catalog from multiple systems degrade cache performance; and,
   automatically controlling catalog caching throughout a period of time based upon a mode of operation providing a best response time, the mode of operation comprising a cache mode of operation and a direct access storage device (DASD) mode of operation.

6. The system of claim 5, wherein:
   the catalog statistical data comprises resource measurement facility (RMF) records.

7. The system of claim 5, the computer program code further comprises computer executable instructions configured for:
   reactivating catalog caching during times where a caching mode of operation provides a most likely best response time.

8. The system of claim 5, wherein:
   the catalog caching comprises a virtual look aside facility (VLF) caching.

9. A non-transitory computer-usable medium embodying computer program code, the computer program code comprising computer executable instructions configured for:
   executing an optimized catalog caching module on a host system;
   communicating with a catalog system via the host system, the catalog system comprising a master catalog, a data set and a plurality of user catalogs, the plurality of user catalogs comprising basic catalog structure (BCS) type catalogs;
   performing historical analysis on catalog usage via the optimized catalog caching module;
   performing analysis of input/output rates for catalog volumes via the optimized catalog caching module;
   predicting times where a cost of catalog caching is not efficient, the predicting times comprising conducting historical analysis on catalog usage via catalog statistical data, the times where a cost of catalog caching is not efficient comprising times of batch operations where updates to a catalog from multiple systems degrade cache performance; and, automatically controlling catalog caching throughout a period of time based upon a mode of operation providing a best response time, the mode of operation comprising a cache mode of operation and a direct access storage device (DASD) mode of operation.

10. The computer-usable medium of claim 9, wherein:
the catalog statistical data comprises resource measurement facility (RMF) records.

11. The computer-usable medium of claim 9, wherein the computer program code further comprises computer executable instructions configured for:
reactivating catalog caching during times where a caching mode of operation provides a most likely best response time.

12. The computer-usable medium of claim 9, wherein:
the catalog caching comprises a virtual look aside facility (VLF) caching.

* * * * *